Oct. 23, 1923.
D. MILLER
1,471,502
TOOL FOR ASSEMBLING OR DISASSEMBLING GEARS OR CAMS AND THEIR AXLES
Filed April 1, 1922
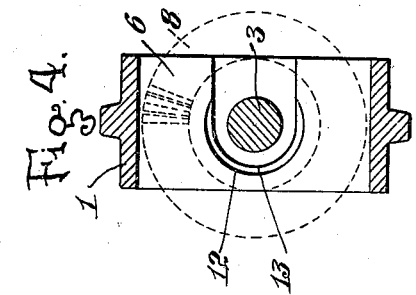
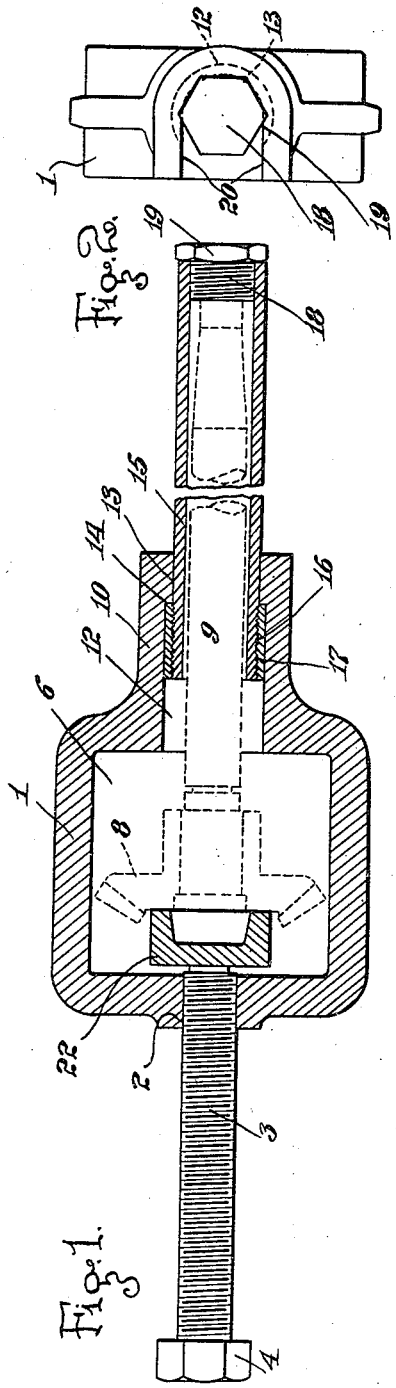
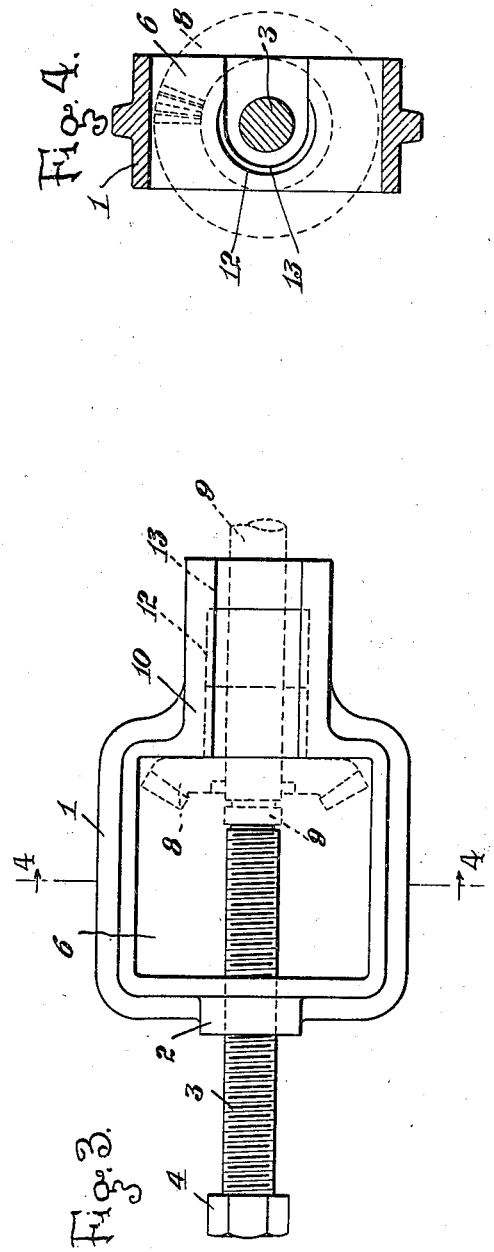
Inventor
*Dorr Miller*
By *his* Attorney Patented Oct. 23, 1923.

1,471,502

UNITED STATES PATENT OFFICE.

DORR MILLER, OF TOLEDO, OHIO.

TOOL FOR ASSEMBLING OR DISASSEMBLING GEARS OR CAMS AND THEIR AXLES.

Application filed April 1, 1922. Serial No. 548,558.

*To all whom it may concern:*

Be it known that I, DORR MILLER, a citizen of the United States, and resident of Toledo, in the county of Lucas and State of Ohio, have invented certain new and useful Improvements in Tools for Assembling or Disassembling Gears or Cams and Their Axles, of which the following is a specification.

This invention relates to a garage tool adapted for forcing or pressing gears or cams onto or off axle shafts. My improved tool is especially designed to facilitate the operation or assembling or removing the gears in repair work, as for instance in the replacing of differential gears of automobiles for which it is particularly adapted. An object of the present invention is to provide a tool which will be simple and inexpensive and which will allow of the operation being performed with greater facility and with a material saving of time.

Important features of my improved tool construction include means for rigidly supporting and holding the parts to be acted on by screw pressure, the parts of which are specially designed for conveniently assembling with relation to the work and the device is designed to be operable both for the assembling of a part upon the shaft and for the separation or removal of the part from position on the shaft or axle. My improved tool is further formed to permit of its being held within a vise when in use and the several parts thereof are relatively adjustable and removable to accommodate for varying conditions of use and to correspondingly add to its operating capacity.

The described and other important features and advantages thereof will be more fully understood by reference to the accompanying drawings wherein like reference characters are applied to the corresponding parts in the several views.

In the drawings:

Fig. 1 is a longitudinal sectional view of my improved device as assembled for the purpose of forcing a gear or like part upon a shaft.

Fig. 2 is an end elevation thereof.

Fig. 3 is a view in side elevation of my improved device as used for separating the shaft from the gear or like part.

Fig. 4 is a cross-sectional view thereof on line 4—4 of Fig. 3.

In the approved embodiment of the features of my invention as here illustrated, 1 indicates the frame and supporting member for the parts which at one end is provided with an internally threaded bearing portion 2 to receive the movable or pressure exerting member, as here shown, in the form of a pressure screw 3 having threaded engagement therewith and provided at its outer extremity with a squared head 4 for the application of a manipulating tool. The member 1 is formed to provide an enlarged opening 6, as here shown, extended laterally therethrough to provide clearance to allow of the introduction of the parts to be acted upon, as hereinafter described.

As will be understood, the requirement of a tool of this character is to suitably support or hold one of the parts being acted upon, such for instance as a wheel axle and to exert pressure upon and impart movement to the other member relative thereto, for instance a differential gear or like member. In this cited instance the operation is to force or press the gear upon the axle and the adjustment and adaptability of my device for this purpose is illustrated in Figs. 1 and 2. My improved tool is of special design which formatively allows of this operation being performed with greater facility than heretofore and further provides for conveniently adapting the device to perform the reverse operation of removing the gear or equivalent member from position upon the shaft or axle. The adaptability of my improved device for the latter purpose, I have illustrated in Figures 3 and 4.

The operation of applying or forcing the gear element upon the shaft or axle and the adjustment and arrangement of the parts as employed therefor will first be described. The gear element and axle are shown in dotted lines and have applied thereto numerals 8 and 9 respectively. In performing this operation, provision is made for holding the axle 9 against longitudinal movement and in proper position while the gear element 8 is forced thereon by means of the pressure or feed screw 3. To this end the frame 1 at the righthand side, as illustrated, has integrally formed therewith a longitudinally extending boss or bearing portion 10 formed with a bore or recess extending longitudinally in axial alignment with the pressure screw 3. The recess is formed of an enlarged inner portion 12, opening into the clearance opening 6, and with an outer reduced portion 13 thereby to provide an inwardly directed shoulder 14. Fitted within the opening 12, 13 is a longitudinally extending tubular member 15 arranged in alignment with the screw 3 and having at its inner end an externally threaded portion 16 to which is threaded an annular member or collar 17 of a size closely fitting the opening 12 and providing an abutment for engagement with the shoulder 14. The tube 15 at its other or outer extremity is internally threaded for the screw engagement therewith of the threaded shank of a plug or stop member 18 formed with the enlarged external squared shoulder 19 as shown.

To facilitate the assembling of the tube 15 with its associated collar 17 within the opening 12, 13 to the position, as best indicated in Fig. 1, I desirably form the bearing portion 10 of the frame and longitudinally for its length with a lateral opening or slot 20, the walls of which are spaced a distance corresponding to the diameter of the outer opening 13.

In the assembling or adjusting of the parts for use, the entry opening 20 allows of the tube 15 containing the axle 9 (placed therein as indicated) to be entered within the opening 12, 13 by insertion from the side when in a position with the tube sufficiently advanced so that the collar member 17 is within the plane of the enlarged opening 6. It will be understood that the screw 3 will first have been retracted to substantially the position of Fig 1 and that the tube after being so inserted from the side and with the collar 17 received within the opening 6, will then be moved longitudinally and outwardly to its operating position, as shown; the collar 17 being thereby received within the opening or bore 12 and engaging the shoulder 14. The latter movement will permit of positioning the gear element 8 within the frame opening 6 in axial alignment with the axle and in position to be acted upon by the pressure or feed screw 3, through the interpositioning of a suitable recessed bearing piece or counterbored bushing 22 bearing against the face of the gear. With the parts so positioned, and by clamping the frame within a suitable vise, upon turning of the pressure screw 3 the gear may be forced upon the axle for the desired distance during which operation the axle or shaft 9 is held against longitudinal movement by engagement at its outer end with the plug 18 supported within the tube 15. The latter in turn is held against outward movement by the engagement of the collar 17 with the shoulder 14. The opening 12 of the bearing portion 10 of the frame is of sufficient diameter to receive therein the bearing or hub flange of the gear 8 when forced upon the shaft. Upon effecting the latter the screw 3 is retracted to initial position, allowing the axle with the gear assembled therewith to be moved toward the left, as shown in Fig. 1, and by withdrawal of the bushing 22 the tube 15 may be similarly moved to the left therewith to a position with the collar 17 fully within the opening 6 allowing of the several parts being withdrawn laterally; the tube 15 being thus positioned to pass outwardly through the slot 20.

As will be appreciated the method of assembling the several parts of my device allows of a desirable degree of adjustability particularly with respect to the longitudinal distance between the stops afforded by the collar 17 and plug 8 which may be varied in their position of adjustment. The internal diameter of the tube 15 is also of a size to accommodate varying sizes of axle shafts which are received loosely therein and thus permit of the shaft being readily centered with relation to the gear which is further facilitated by their accessibility afforded by the opening 6.

With the removal, as aforesaid, of the tube 15 with the collar 17 and plug 18 attached thereto and also of the separable bushing 22 the device is adapted to perform the reverse operation of removing the gear from assembled position upon the shaft, as indicated in Figures 3 and 4. This is accomplished upon retracting the screw 3 a distance sufficient to admit the passage of the gear and hub thereof within the confines of the opening 6, allowing the axle shaft 9 to be inserted through the slot 20 after which the gear may be moved outwardly to the position indicated in Fig. 3 with its rear face in engagement and supported by the end wall of the opening or forward face of the bearing portion 10. Upon then advancing the screw plunger 3 it will, by engagement with the end of the axle shaft, force the latter, now unsupported from longitudinal movement, outwardly to separate it from the gear. This is permitted by reason of the screw shank 3 being of a diameter sufficiently reduced to allow of its entry within the gear aperture or bore. The subsequent removal of the gear is effected upon retraction of the screw.

I have thus produced an improved tool of few and simple parts which are of strong but light construction and provide a tool particularly adapted to perform the operation described in an efficient and economical manner. The use of my device avoids the objections and resulting damage to the parts incident to the common practise of hammering the parts to effect their separation.

While I have described an approved embodiment of the several features of my invention it will be understood that various modifications may be made therein without departing from the scope of the invention as defined in the appended claims.

Having described my invention I claim:

1. A garage tool adapted to effect the assembling of gear and like members upon shafts and the separation thereof, comprising a frame formed to provide an enlarged opening, a threaded bearing at one side of said opening and having a longitudinal recessed bearing porton at the opposite side of the opening, a pressure screw fitted to the threaded bearing, a tubular holding member fitted to the recessed bearing and adapted to support the shaft in an advanced position and against longitudinal movement to permit of a gear member being forced thereon by the pressure screw, said holding means being removable and said frame being adapted, upon removal of the holding means, for supporting the gear member against longitudinal movement and to allow of the longitudinal movement of the shaft with relation thereto under the action of the screw, substantially as described.

2. A garage tool adapted to effect the assembling of gear and like members upon shafts and the separation thereof, comprising a frame formed to provide an enlarged opening laterally therethrough, a threaded bearing at one side of said opening and having a longitudinally recessed bearing portion at the opposite side of the opening, a pressure screw fitted to the threaded bearing, a tubular holding member fitted to the recessed bearing and adapted to support the shaft in a relatively advanced position and against longitudinal movement to permit of a gear member being forced thereon by the action of the pressure screw, said holding means being adjustable for length and removable and said frame being adapted, upon removal of the holding means, for supporting the gear member against longitudinal movement and to allow of the longitudinal movement of the shaft with relation thereto under the action of the screw, substantially as described.

3. A tool of the character described comprising a frame member formed to provide an enlarged lateral opening to admit the parts to be acted upon and having a threaded bearing at one side of said opening and a bearing portion at the opposite side of said opening provided with a recess or opening longitudinally therethrough and in axial alignment with the threaded bearing, said bearing opening being formed to provide a forwardly directed shoulder, a tubular holding member fitted within the recessed bearing and provided at its inner end with a shoulder opposed to the shoulder aforesaid for rigidly securing the holding member within the recess, said holding member being adapted for receiving and supporting a shaft against longitudinal movement and said frame member being formed to oppose longitudinal movement of a gear member and to permit longitudinal movement of the shaft upon removal of the holding member, substantially as described.

4. A tool of the character described comprising a frame member formed to provide an enlarged lateral opening to admit the parts to be acted upon and having a threaded bearing at one side of said opening and a bearing portion at the opposite side of said opening provided with a recess or opening longitudinally therethrough and in axial alignment with the threaded bearing and with a laterally opening slot or passage thereto, said bearing opening being formed to provide a forwardly directed shoulder, a tubular holding member fitted within the recessed bearing and provided at its inner end with a threaded collar or shoulder opposed to the shoulder aforesaid for rigidly securing the holding member within the recess, said holding member being adapted for receiving and supporting a shaft against longitudinal movement and said frame member being formed to oppose longitudinal movement of a gear member and to permit longitudinal movement of the shaft upon removal of the holding member.

Signed at Toledo in the county of Lucas and State of Ohio this 23rd day of March, A. D., 1922.

DORR MILLER.